(12) United States Patent
Wagh

(10) Patent No.: US 7,849,243 B2
(45) Date of Patent: Dec. 7, 2010

(54) ENABLING FLEXIBILITY OF PACKET LENGTH IN A COMMUNICATION PROTOCOL

(75) Inventor: Mahesh Wagh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 337 days.

(21) Appl. No.: 12/009,970

(22) Filed: Jan. 23, 2008

(65) Prior Publication Data

US 2009/0185580 A1 Jul. 23, 2009

(51) Int. Cl.
*G06F 3/00* (2006.01)

(52) U.S. Cl. .......................... 710/105; 710/29

(58) Field of Classification Search ............... 710/29, 710/35, 105

See application file for complete search history.

(56) References Cited

U.S. PATENT DOCUMENTS

| | | | | |
|---|---|---|---|---|
| 4,542,380 A * | 9/1985 | Beckner et al. | ............. | 370/300 |
| 5,343,473 A * | 8/1994 | Cidon et al. | ................. | 370/465 |
| 5,557,608 A * | 9/1996 | Calvignac et al. | ........... | 370/389 |
| 5,956,729 A * | 9/1999 | Goetz et al. | ................. | 707/802 |
| 6,009,488 A | 12/1999 | Kavipurapu | ............... | 710/105 |
| 6,209,079 B1 * | 3/2001 | Otani et al. | ................. | 712/210 |
| 6,633,564 B1 * | 10/2003 | Steer et al. | .................. | 370/389 |
| 6,724,721 B1 * | 4/2004 | Cheriton | ...................... | 370/229 |
| 6,891,855 B2 * | 5/2005 | Bruckman | .................. | 370/468 |
| 6,901,049 B1 | 5/2005 | Chapman | | |
| 6,912,251 B1 * | 6/2005 | Ward et al. | ................... | 375/240 |
| 6,996,100 B1 | 2/2006 | Haartsen | | |
| 7,123,621 B1 * | 10/2006 | Niida et al. | ................. | 370/402 |
| 7,142,540 B2 * | 11/2006 | Hendel et al. | ............... | 370/392 |
| 7,245,613 B1 * | 7/2007 | Winkles et al. | ............. | 370/365 |
| 7,321,596 B2 | 1/2008 | Ohnishi | | |
| 7,558,954 B2 * | 7/2009 | Apostolopoulos et al. | ... | 713/161 |
| 7,698,478 B2 * | 4/2010 | Wang et al. | ................... | 710/29 |
| 2003/0128705 A1 * | 7/2003 | Yi et al. | ...................... | 370/394 |
| 2009/0323547 A1 * | 12/2009 | Caesar et al. | ............... | 370/252 |

FOREIGN PATENT DOCUMENTS

JP 61241843 A * 10/1986

OTHER PUBLICATIONS

PCI Express Base Specification Revision 1. Jul. 22, 20020.*
U.S. Appl. No. 11/592,341, filed Nov. 2, 2006, entitled, "PCI Express Enhancements and Extensions," by Jasmin Ajanovic, et al.
Korean Patent Office, International Search Report and Written Opinion for International Application No. PCT/US2009/031461, 11 pages, Aug. 24, 2009.

* cited by examiner

*Primary Examiner*—Paul R Myers
(74) *Attorney, Agent, or Firm*—Trop, Pruner & Hu, P.C.

(57) ABSTRACT

In one embodiment, the present invention includes a method for transmitting a packet from a transmitter to a receiver along an interconnect and terminating transmission of the packet at a packet disconnect boundary, which has a length less than a payload length of the packet. After such termination, another packet such as a higher priority packet can be transmitted, or a remainder of the original packet may be transmitted as a separate packet. Other embodiments are described and claimed.

14 Claims, 3 Drawing Sheets

ENABLING FLEXIBILITY OF PACKET LENGTH IN A COMMUNICATION PROTOCOL

BACKGROUND

Computer systems include a number of components and elements, which are typically coupled via a bus or interconnect. Previously, input/output (IO) devices were coupled together through a conventional multi-drop parallel bus architecture referred to as Peripheral Component Interconnect (PCI). More recently, a new generation of an IO bus referred to as PCI-Express (PCIe) has been used to facilitate faster interconnection between devices having a serial physical layer communication protocol.

A PCIe architecture includes a layered protocol to communicate between devices. As an example, a physical layer, link layer, and transaction layer form a PCIe protocol stack. The PCIe link is built around dedicated unidirectional pairs of serial point-to-point connections referred to as a lane. A link between devices includes some number of lanes, such as one, two, sixteen, thirty-two, and so-on. The current PCIe specification, PCI Express™ Specification Base Specification version 2.0 (published Jan. 17, 2007), is available at http://www.pcisig.com/specifications/pciexpress/.

A PCIe protocol utilizes credit-based flow control mechanisms to transfer packets across a link. The receiver advertises credits equal to the amount of storage buffers available at the receiver. The transmitter is not permitted to issue transactions that can consume more credits than what the receiver has advertised. The payload length supplied in the transmitter request header is required to match exactly to the amount of data payload supplied and be less than or equal to credits available at the receiver in order to service the transaction. This can unnecessarily limit flexibility in data communication.

DETAILED DESCRIPTION

Figure 1:
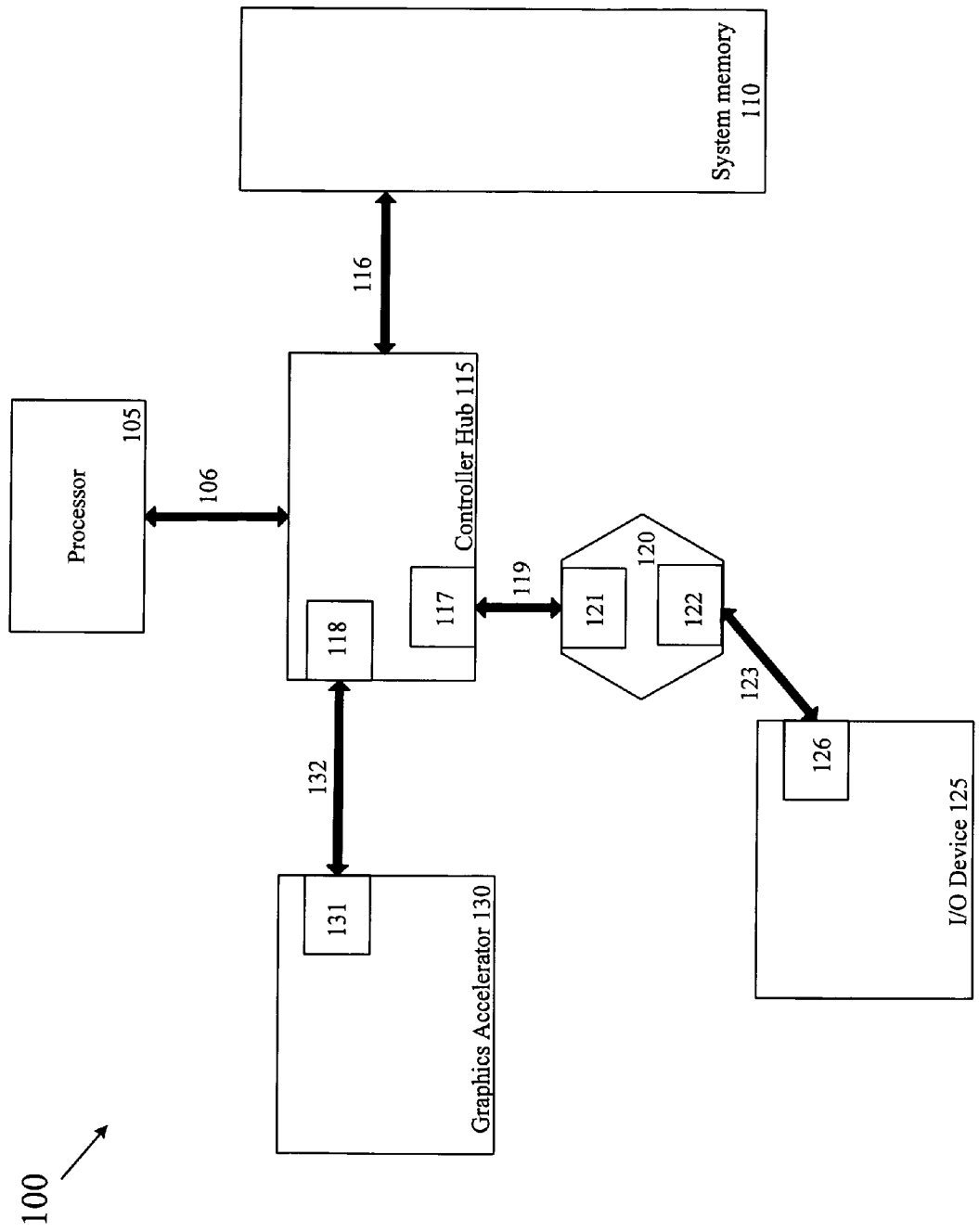
FIG. 1 is a block diagram of a system in accordance with one embodiment of the present invention.

Referring to FIG. 1, a block diagram of a system in accordance with one embodiment of the present invention including devices coupled to a controller hub via a serial link is illustrated. System 100 includes a processor 105 and a system memory 110 coupled to a controller hub 115. Processor 105 includes any processing element, such as a microprocessor, a host processor, an embedded processor, a co-processor, or other processor. Processor 105 is coupled to controller hub 115 through a front-side bus (FSB) 106. In one embodiment, FSB 106 is a serial point-to-point (PtP) interconnect as described below.

System memory 110 includes any memory device, such as random access memory (RAM), non-volatile (NV) memory, or other memory accessible by devices in system 100. System memory 110 is coupled to controller hub 115 through a memory interface 116.

In one embodiment, controller hub 115 is a root hub or root controller in a PCIe interconnection hierarchy. Examples of controller hub 115 include a chipset, a memory controller hub (MCH), a northbridge, an input/output controller hub (ICH) a southbridge, and a root controller/hub. Here, controller hub 115 is coupled to a switch/bridge 120 through a serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120. Embodiments may also apply where a processor and chipset are integrated into the same package. Further, this technique does not require a new revision of PCIe protocol, and can be implemented by PCIe 2.0, 1.1 compatible devices, among others. Thus embodiments can be used anywhere a PCIe interconnect is used for communication.

Switch 120 routes packets/messages from a device 125 upstream, i.e., up a hierarchy towards controller hub 115 and downstream, i.e., down a hierarchy away from controller hub 115 to device 125. IO modules 122 and 126 implement a layered protocol stack to communicate between switch 120 and device 125. Device 125 includes any internal or external device or component to be coupled to an electronic system, such as an IO device, a network interface controller (NIC), an add-in card, an audio processor, a network processor, a hard-drive, a storage device, a monitor, a printer, a mouse, a keyboard, a router, a portable storage device, a Firewire device, a Universal Serial Bus (USB) device, a scanner, and other input/output devices.

A graphics accelerator 130 is also coupled to controller hub 115 through serial link 132. In one embodiment, graphics accelerator 130 is coupled to an MCH, which is coupled to an ICH. Switch 120, and accordingly IO device 125, is then coupled to the ICH. IO modules 131 and 118 are also to implement a layered protocol stack to communicate between graphics accelerator 130 and controller hub 115.

In one embodiment, a PCIe protocol stack may include a transaction layer, a link layer, and a physical layer. In one embodiment, the transaction layer is to provide an interface between a device's processing core and the interconnect architecture, such as a data link layer and a physical layer. In this regard, a primary responsibility of the transaction layer is the assembly and disassembly of packets (i.e., transaction layer packets, or TLPs). PCIe implements split transactions, i.e., transactions with request and response separated by time, allowing a link to carry other traffic while the target device gathers data for the response.

In addition PCIe utilizes credit-based flow control. In this scheme, a device advertises an initial amount of credit for each of the receive buffers in the transaction layer. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

The link layer acts as an intermediate stage between the transaction layer and the physical layer. In one embodiment, a responsibility of the data link layer is to provide a reliable mechanism for exchanging TLPs between two components by a link. One side of the link layer accepts TLPs assembled by the transaction layer, applies identifiers, calculates and applies an error detection code, i.e., cyclic recovery codes (CRC), and submits the modified TLPs to the physical layer for transmission across a physical link to an external device.

In one embodiment, the physical layer physically transmits a packet to an external device. The physical layer includes a transmit section to prepare outgoing information for transmission and a receiver section to identify and prepare received information before passing it to the link layer. The physical layer includes a transmitter and a receiver. The transmitter is supplied with symbols, which the transmitter serializes and transmits onto to an external device. The receiver is supplied with serialized symbols from an external device and transforms the received signals into a bit-stream. The bit-stream is de-serialized and supplied to a logical sub-block. In one embodiment, an 8b/10b transmission code is employed, where ten-bit symbols are transmitted/received. In addition, in one example, the receiver also provides a symbol clock recovered from the incoming serial stream. As stated above, although the transaction layer, link layer, and physical layer are discussed in reference to a specific embodiment of a PCIe protocol stack, a layered protocol stack is not so limited. In fact, any layered protocol may be included/implemented.

In accordance with the PCIe protocol, the following rules apply to a transmitter that intends to initiate a transaction with data: (1) a transmitter must issue requests with a data length equal or less than a configured maximum payload size; (2) a transmitter must guarantee that the length of the request is less than or equal to the credits available at the receiver to service the request; (3) a transmitter must guarantee that once a packet transmission begins, it can provide/stream data as indicated in the request length field, in other words the transmitter cannot stall a packet transfer, thus the transmitter must buffer data or guarantee that it can stream data at the packet rate; and (4) any high priority packet must wait for the current packet with data to finish before it can be issued. However, some implementations may terminate a packet with an 'End Bad' termination symbol, in which case any data that was transmitted is dropped by the receiver.

To improve flexibility in this protocol, embodiments may define an allowable packet disconnect boundary. In this way, the transmitter is permitted to terminate a request at the allowable packet disconnect boundary. While the scope of the present invention is not limited in this regard, the allowable packet disconnect boundary may be 64 bytes (B) or multiple of 64 B or other configurable quantity. Some embodiments may also include flow control and length protocol enhancements to enable such variable length transmissions. The transmitter can terminate a packet as per PCIe packet termination rules, with the CRC and normal packet end symbol inserted to terminate the packet.

In some embodiments, length rules can be enhanced such that the length field indicates the payload size the transmitter intends to transfer, however, the packet may be terminated at an allowable packet disconnect boundary. For example, a transmitter may initiate a packet transfer with a length indicating a transfer size of 256 B but terminate the packet after transmitting the first 128 B of payload data. If the transmission is successful, i.e., does not incur any transmission errors, then the receiver consumes the first 128 B of packet that was successfully transferred, rather than dropping the data as per an "End Bad" process. The transmitter may transfer the remaining payload as a separate newly issued transaction; the receiver is not required to keep a history of the previously received transaction. The transmitter may initiate a new transaction to complete the original intended payload with a length equal to 128 B and provide the remaining payload, or the transmitter may start a new packet with a different length starting from the previously disconnected packet boundary, or may initiate a new high priority packet.

In some embodiments, the flow control rules may be enhanced such that the transmitter is permitted to initiate a transaction as long as it has credits up to the allowable disconnect boundary and it can guarantee data to be streamed. If the receiver releases credits up to the next allowable disconnect boundary, the transmitter is permitted to continue its transmission beyond the current allowable disconnect boundary up to the next allowable disconnect boundary, provided sufficient credits are available and data can be provided without stalls.

Thus embodiments provide protocol enhancements to permit a transmitter to specify a payload length that may exceed the actual amount of data supplied in the payload. The amount of data supplied in the payload has to guarantee that it does not exceed the amount of credits allocated by the receiver. The packet can be terminated/suspended at a specified disconnect boundary. With this scheme a large packet, for example a 4 kilobyte (KB) packet (length=4 KB), is permitted to be terminated at a disconnect boundary in order to interleave a high priority packet.

Embodiments may further enhance this protocol enhancement to: (1) optimize receiver buffers, streaming data from memory; (2) improve link utilization based on credit returns; and (3) optimize transmitter store and forward mechanisms, thus enabling streaming data over a PCIe interconnect. Accordingly, a transmitter can initiate the transfer of a large packet once it has stored data equal to the disconnect boundary or can guarantee data to be streamed without stalls at least up to the disconnect boundary and has sufficient receiver credits allocated. Upon approaching the disconnect boundary, the transmitter may continue with data payload if it has data stored up to the next disconnect boundary, or it can guarantee data to be streamed without stalls until the next disconnect boundary and has enough header credits allocated. If data stored is less than the disconnect boundary or data streaming up to the disconnect boundary cannot be guaranteed or lack of receiver credits, the packet is terminated by transmitter.

Embodiments thus enable implementations to optimize receiver buffers, improve link utilization and optimize transmitter buffers. In contrast, conventional PCIe mechanisms are more rigid and require the requestor to delay the transmission of requests until a payload worth of credits is received and does not permit 'on-the-fly' optimization. Using embodiments of the present invention, data from a memory controller can be streamed over a PCIe interconnect. Completions (e.g., memory reads issued by an IO device) can indicate the completion payload equal to the maximum payload size and optimize for completion payloads. This enables completions to be returned at least equal to 64 B and up to the maximum payload size, thus improving the link utilization for read completions.

Figure 2A:
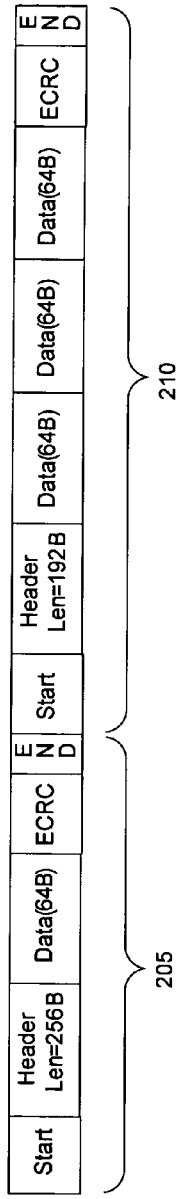
FIG. 2A is an example of transmission of data packets in accordance with one embodiment of the present invention.

Referring now to FIG. 2A, shown is an example of transmission of data packets 200 in accordance with one embodiment of the present invention. As shown in FIG. 2A, a transmitter may transmit packet 205, originally intended to have a payload length of 256 bytes, as indicated in the header portion of packet 205, with an early termination. More specifically, packet 205 is terminated after a first allowable disconnect boundary of 64 bytes is reached. Thus as shown in FIG. 2A, packet 205 includes a start portion, a header length portion, a payload portion (which corresponds to a length of the allowable disconnect boundary) followed by an end-to-end CRC (ECRC), which in turn is followed by a termination sequence, which includes a link CRC portion and an end portion. Note that two CRC protocols may be used, a link CRC, which is used for all packets, and an optional ECRC that is used to protect packets end-end. The distinction is as follows: the link CRC is applied by the link to protect the packet transmission from transmitter to receiver across the link, and the optional ECRC (if supported) is applied by the transaction layer to protect the packet, and is only inspected by the final destination, which could be multiple hops away. The inspection is also carried out by the final destination's transaction layer. After transmission of this terminated packet 205, another packet 210 is transmitted to include the remaining data portion of the terminated packet 205. More specifically, packet 210 is identified as having a payload length of 192 bytes (i.e., corresponding to the remainder of the packet length of terminated packet 205). Thus as shown in FIG. 2A, packet 210 transmits 192B of payload, followed by an ECRC portion and an end portion.

Figure 2B:
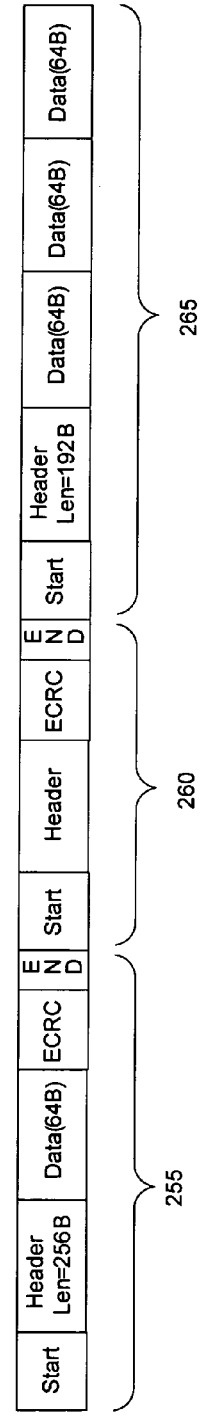
FIG. 2B is an example of three packets that are part of a data stream in accordance with one embodiment of the present invention.

By providing a transmitter with the ability to terminate a packet, embodiments may enable interleaving of high priority packets after a terminated packet, which can then be followed by the remainder of the disconnected packet. As shown in FIG. 2B, three packets are part of a data stream 250, namely terminated packet 255, high priority packet 260, and remainder packet 265. After termination of terminated packet 255, high priority packet 260, in the embodiment shown in FIG. 2B, includes only a start portion, header portion and ECRC and end portion (i.e., a high priority packet without data). After transmission of this high priority packet, the transmitter may then send remainder packet 265, which provides the remainder portion of the disconnected packet. Thus as shown in FIG. 2B, remainder portion 265 transmits the remaining 192B of the data payload. While shown with these particular examples in the embodiments of FIGS. 2A and 2B, the scope of the present invention is not limited in this regard.

Figure 3:
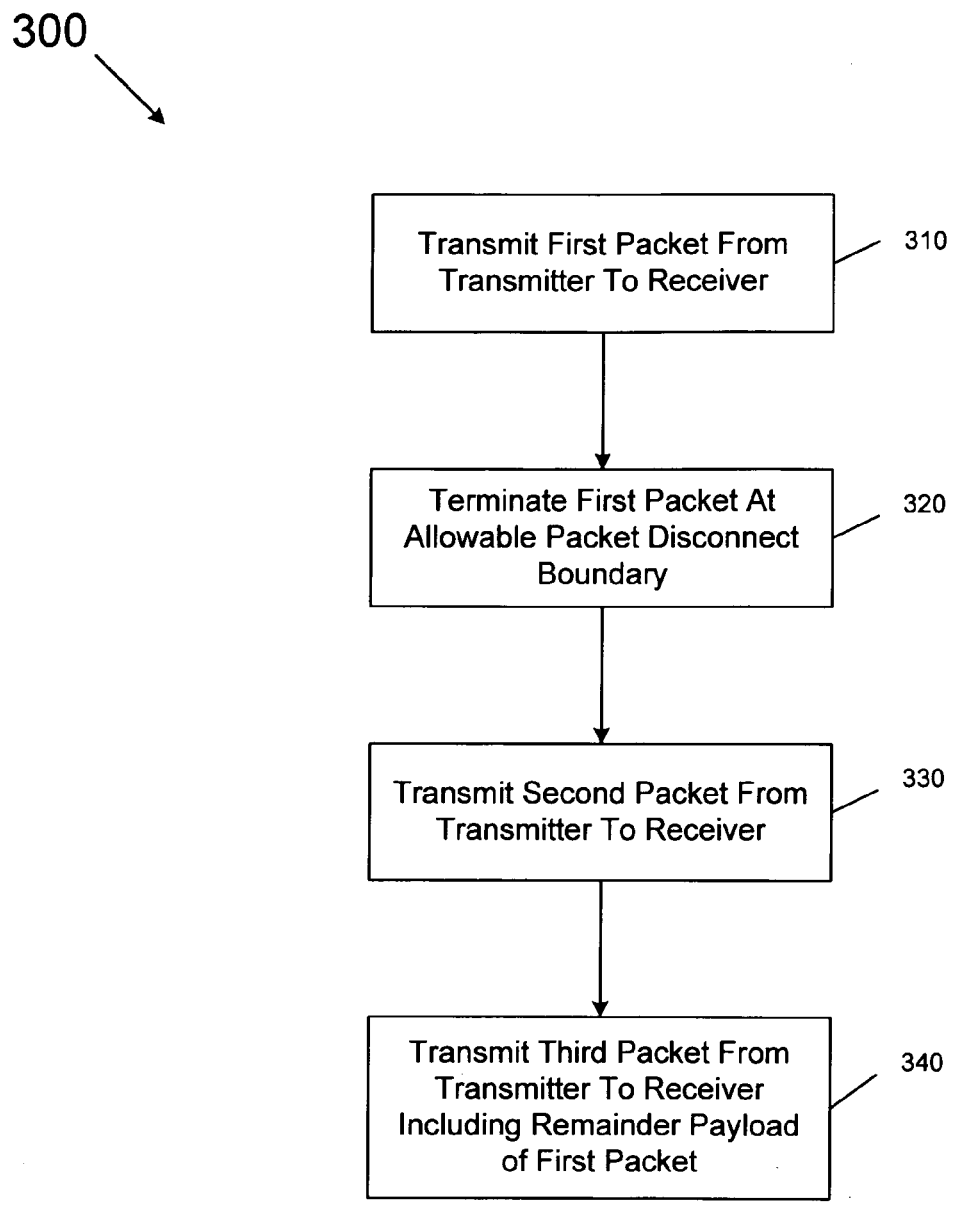
FIG. 3 is a flow diagram of a method in accordance with one embodiment of the present invention.

Referring now to FIG. 3, shown is a flow diagram of a method in accordance with one embodiment of the present invention. As shown in FIG. 3, method 300 may be used to transmit a packet from a transmitter to a receiver. Specifically, as shown in FIG. 3, method 300 may begin by transmitting a first packet from the transmitter to the receiver (block 310). Such a packet may include a header to indicate a packet length which may be a multiple number of data portions, each corresponding to a length of an allowable packet disconnect boundary, in one embodiment. For example, the header length may be for a relatively long payload, e.g., of 4 KB, where the communication protocol of the interconnect that couples the transmitter and receiver may have an allowable packet disconnect boundary of 64 bytes.

During transmission of the first packet, the transmitter, and more specifically a transaction layer of the transmitter or an internal fabric of the device may choose to terminate the transmission, for example to enable interleaving of a higher priority packet. Thus as shown in FIG. 3 at block 320 the first packet may be terminated at an allowable packet disconnect boundary. In terminating the first packet, the transmitter may send an error coding portion, e.g., an ECRC, as well as an end signal to indicate termination of the first packet. Then, the transmitter may transmit a second packet from transmitter to receiver (block 330). In one embodiment, the second packet may correspond to a higher priority packet which may or may not include payload data.

Referring still to FIG. 3, after the second packet is transmitted, a third packet may be transmitted from transmitter to receiver. In various embodiments, this third packet may include a remainder payload of the first packet (block 340). For example, assume that the first packet was terminated at an allowable packet disconnect boundary after transmission of a 2 KB portion of the payload of the first packet. In this case, the third packet may include a header portion indicating a length of 2K, and the corresponding data payload may provide the remaining 2K of the payload data originally intended for the first packet. While shown with this particular implementation in the embodiment of FIG. 3, the scope of the present invention is not limited in this regard.

Embodiments may reduce the silicon foot print (gate count) for chipset and endpoint designs, and improves the link bandwidth utilization, thus providing additional data throughput that improves maximum achievable platform bandwidth and application performance.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   transmitting a first packet from a transmitter to a receiver along an interconnect, the first packet including a header indicating a payload length of a first size; and
   terminating transmission of the first packet at a packet disconnect boundary when the transmitter does not have sufficient credits to transfer data to a next packet disconnect boundary, the transmitter cannot guarantee streaming data to the next packet disconnect boundary, or the transmitter has insufficient data stored to the next packet disconnect boundary, the packet disconnect boundary corresponding to an allowable packet disconnect boundary for an extension to a communication protocol of the interconnect and having a length less than the payload length, wherein the packet transmission is terminated after transmission of a first portion of a payload corresponding to the payload length of the first size, and wherein the communication protocol requires the transmitter to guarantee that the payload length is less than or equal to available credits at the receiver and to guarantee no stall of packet transfer.

2. The method of claim 1, further comprising transmitting a second packet from the transmitter to the receiver after terminating the first packet, the second packet having a higher priority than the first packet.

3. The method of claim 2, further comprising transmitting a third packet after transmitting the second packet, the third packet including a remainder of the payload of the first packet.

4. The method of claim 3, further comprising consuming the first portion of the packet in the receiver and not maintaining a history of the first packet in the receiver.

5. The method of claim 4, further comprising transmitting the first packet when the transmitter has credits sufficient to reach the packet disconnect boundary, wherein transmitting the first packet comprises streaming data of the first portion of the payload from the transmitter to the receiver.

6. The method of claim 1, wherein the allowable packet disconnect boundary is configurable.

7. The method of claim 1, wherein terminating the first packet includes transmitting an error code portion and a packet end symbol after the packet disconnect boundary.

8. An apparatus comprising:
a first component to communicate with a second component over a point-to-point (PtP) interconnect, wherein the first component is to transmit a first packet along the PtP interconnect, the first packet including a header indicating a payload length of a first size, and terminate transmission of the first packet at a packet disconnect boundary, the packet disconnect boundary having a length less than the payload length, wherein the first component is further to transmit a second packet after termination of the first packet, the second packet having a higher priority than the first packet, and to transmit a third packet after transmission of the second packet, the third packet including a header including a payload length of a second size corresponding to a remainder of a payload of the first packet, and a payload portion corresponding to the payload remainder of the first packet, and wherein a communication protocol of the PtP interconnect requires the first component to guarantee that the payload length is less than or equal to available credits at the second component and to guarantee no stall of packet transfer.

9. The apparatus of claim 8, wherein the second component is to consume the first portion of the packet and not maintain a history of the first packet.

10. The apparatus of claim 8, wherein the first component is to transmit an error code portion and a packet end symbol after the packet disconnect boundary and before the second packet.

11. The apparatus of claim 8, wherein the first component is to transmit the first packet when the first component has credits sufficient to reach the packet disconnect boundary, the first portion of the payload comprising streaming data.

12. The apparatus of claim 8, wherein the packet disconnect boundary corresponds to a configurable allowable packet disconnect boundary of the communication protocol of the PtP interconnect.

13. An apparatus comprising:
a transmitter to communicate with a component over a point-to-point (PtP) interconnect, wherein the transmitter is to transmit a first packet along the PtP interconnect, the first packet including a header indicating a payload length of a first size, when the transmitter has stored data equal to a packet disconnect boundary or can guarantee data to be streamed at least to the packet disconnect boundary, and having sufficient credits to the packet disconnect boundary, and terminate transmission of the first packet at the packet disconnect boundary when the transmitter upon approaching the packet disconnect boundary cannot guarantee data to be streamed without stalls until a next disconnect boundary, if the stored data is less than the next disconnect boundary, or does not have enough credits allocated to the next packet disconnect boundary, and wherein a communication protocol of the PtP interconnect requires the transmitter to guarantee that the payload length is less than or equal to available credits at the component and to guarantee no stall of packet transfer.

14. The apparatus of claim 13, wherein the packet disconnect boundary corresponds to a configurable allowable packet disconnect boundary of the communication protocol of the PtP interconnect.

* * * * *